US009311019B2

(12) United States Patent
Winokur

(10) Patent No.: US 9,311,019 B2
(45) Date of Patent: Apr. 12, 2016

(54) STORAGE SYSTEM AND METHOD FOR ACCESSING LOGICAL VOLUMES

(71) Applicant: Infinidat Ltd., Herzliya (IL)

(72) Inventor: Alex Winokur, Haifa (IL)

(73) Assignee: INFINIDAT LTD., Herzliya (IL)

( * ) Notice: Subject to any disclaimer, the term of this patent is extended or adjusted under 35 U.S.C. 154(b) by 206 days.

(21) Appl. No.: 13/952,716

(22) Filed: Jul. 29, 2013

(65) Prior Publication Data
US 2015/0032980 A1    Jan. 29, 2015

(51) Int. Cl.
*G06F 3/06* (2006.01)
*G06F 12/14* (2006.01)

(52) U.S. Cl.
CPC .............. *G06F 3/0665* (2013.01); *G06F 3/067* (2013.01); *G06F 3/0619* (2013.01); *G06F 3/0622* (2013.01); *G06F 12/14* (2013.01); *G06F 12/1466* (2013.01)

(58) Field of Classification Search
CPC ....... G06F 3/067; G06F 3/0622; G06F 12/14; G06F 12/1466
USPC .......................................... 711/152, 154, 163
See application file for complete search history.

(56) References Cited

U.S. PATENT DOCUMENTS

| | | | |
|---|---|---|---|
| 5,584,008 A | 12/1996 | Shimada et al. | |
| 5,673,382 A | 9/1997 | Cannon et al. | |
| 6,954,768 B2 | 10/2005 | Carlson et al. | |
| 7,143,235 B1 | 11/2006 | Watanabe et al. | |
| 7,275,103 B1 | 9/2007 | Thrasher et al. | |
| 7,313,718 B2 | 12/2007 | Kelman | |
| 7,584,340 B1 | 9/2009 | Colgrove | |
| 7,783,847 B2 | 8/2010 | Moore et al. | |
| 7,818,517 B1* | 10/2010 | Glade et al. | 711/154 |
| 7,836,266 B2 | 11/2010 | Zohar et al. | |
| 7,937,551 B2 | 5/2011 | Schott | |
| 8,001,295 B2 | 8/2011 | Strutt | |
| 8,069,191 B2 | 11/2011 | Revah et al. | |
| 8,219,777 B2 | 7/2012 | Jacobson et al. | |
| 2004/0049564 A1* | 3/2004 | Ng et al. | 709/223 |
| 2007/0043705 A1 | 2/2007 | Kaushik et al. | |
| 2008/0010409 A1* | 1/2008 | Rao et al. | 711/118 |
| 2008/0270700 A1* | 10/2008 | Rao et al. | 711/118 |
| 2009/0019251 A1 | 1/2009 | Helman et al. | |
| 2009/0089462 A1* | 4/2009 | Strutt | 710/16 |
| 2010/0115208 A1* | 5/2010 | Logan | 711/147 |
| 2011/0078398 A1 | 3/2011 | Jess | |
| 2012/0259961 A1 | 10/2012 | Winokur | |

OTHER PUBLICATIONS

U.S. Appl. No. 12/957,613, filed Dec. 1, 2010 in the name of Alex Winokur.
U.S. Appl. No. 13/004,947, filed Jan. 12, 2011 and titled "Storage System and Method of Operating Thereof".
U.S. Appl. No. 13/081,963, filed Apr. 7, 2011 in the name of Alex Winokur.
Symantec, "Veritas CommandCentral (tm)—Supporting the Virtual Enterprise," White Paper: Storage Management, Apr. 2009.
U.S. Appl. No. 12/941,246, filed Nov. 8, 2010 in the name of Alex Winokur.

* cited by examiner

*Primary Examiner* — Than Nguyen
(74) *Attorney, Agent, or Firm* — Reches Patents

(57) ABSTRACT

A method and a storage system are provided for accessing volumes. The storage system provisions to a host, a place holder handle configured for allowing access to any volume selected by the host and allowed to be accessed by the host. The volume forms part of accessible volumes included in the storage system. The storage system receives from the host a first request for associating the place holder handle with a first selected volume from among the accessible volumes and enables the host to access the first selected volume in response to receiving an access request indicative of the place holder handle.

19 Claims, 11 Drawing Sheets

| Handle 1021(1) | Volume A 1031(1) | Handle type 1041(1) = regular |
|---|---|---|
| Handle 1021(2) | Volume B 1031(2) | Handle type 1041(2) = regular |
| Handle 1021(3) | NONE 1031(3) | Handle type 1041(3) = place holder |
| Handle 1021(4) | Volume C 1031(4) | Handle type 1041(4) = place holder |

| Handle 1021(1) | Volume A 1031(1) | Handle type 1041(1) = regular |
|---|---|---|
| Handle 1021(2) | Volume B 1031(2) | Handle type 1041(2) = regular |
| Handle 1021(3) | Volume D 1031(3) | Handle type 1041(3) = place holder |
| Handle 1021(4) | Volume E 1031(4) | Handle type 1041(4) = place holder |

1020'

FIG. 11B creating a place holder handle configured for allowing access to any volume selected by the host from a certain volume family and provisioning the place holder to a host that requested the place holder handle
1310 receiving from the host a first request for associating the place holder handle with a first selected volume from among volumes of the snapshot family
1320 enabling the host to access the first selected volume in response to receiving an access request indicative of the place holder handle
1330

STORAGE SYSTEM AND METHOD FOR ACCESSING LOGICAL VOLUMES

FIELD OF THE INVENTION

This invention relates to the field of volume management.

BACKGROUND OF THE INVENTION

Attention is first drawn to FIG. 1 showing a schematic illustration of a system 100 for accessing data in an external virtual memory, and also occasionally to FIG. 2 illustrating a host associated with a few volumes by means of corresponding ITLs, in accordance with the prior art. The system includes one or more hosts 101-1 to 101-$n$, hosting each of one or more applications (not shown) and coupled to a storage system 102 for accessing data residing in the storage system. The data resides in volumes (denoted $V_s$, not shown in FIG. 1) of external virtual memory (say spread across virtual disk units 104-1 to 104-$n$). Note that $V_s$ is storage system/vendor specific and in certain cases it is unanimous with Global Unit ID (GUID) or with a volume serial number.

An application (not shown) in Host 101-1 accesses a volume of external virtual memory 104-2 through a handle being for example ITL where I stands for initiator port, say 108-1 and T stands for a target port, say (109-2), and L stands for LUN, say 110-1. As is well known, the host may employ a plurality of initiator ports each of which is associated to one or more applications. The virtual memory may employ a plurality of target ports typically according to the number of volumes spread across the virtual memory where each pair of corresponding initiator port and target port is connected by means of unique Logical Unit Number—LUN. Thus, for example, initiator port 108-$n$ and target port 109-($n-1$) are connected through unique LUN (110 $n-1$). This can be illustrated, for example, also with reference to FIG. 2 where application 202-$n$ of Host 101-2 accesses (through initiator port 108-1) any of volumes $V_{s1}$-$V_{s4}$ (201-1 to 201-4) of external virtual memory 104-2 through respective target ports 109-2 (A)-(D).

Note that whereas for convenience of explanation the link between the Initiator port and the Target port is marked by LUN, the latter is not a physical entity but rather it is a logical entity, e.g., an entry in a table that signifies that a connection from I to T is allowed and it is identified with that number. Note also that a plurality of LUNs may be associated with a given Target port.

The specified volumes may represent snapshots (each volume representing one or more snapshots) of data of a primary volume associated with the host. The snapshots are created in accordance with a pre-defined policy prescribed by the storage manager, e.g. 107 of FIG. 1).

Reverting now to FIG. 1, there are also shown host management modules 103-$i$ each associated with its respective host 101-$i$ operating under the control of Storage Administrator module 107 for providing handles viewed by the volumes and by the applications. As is well known, LUN is the identifier of a device which is being addressed by storage access protocol (e.g. SCSI protocol). As shown, for example, in FIG. 2, each of the specified volumes $V_{s1}$ to $V_{s4}$ (201-1 to 201-4) is accessible to the application $AP_n$ by means of respective unique LUN 203-1 to 203-4. It is thus evident that for an application to access data (utilizing an access protocol command, say SCSI) in a volume of virtual memory, an ITL that associates the application and the volume, is utilized. In the latter, I stands for the initiator port (say 108-1 in FIG. 2), T stands for target port of the volume (say 109 (2) B, in FIG. 2) and L stands for the unique LUN. ITL is an example of a volume viewable handle. From the perspective of the host side, the volume is viewable to the application by associating the handle (e.g. ITL) to the application by an application viewable volume $V_h$ allowing the application to access the associated volume. Note that the syntax of $V_h$ is operating system specific. For MS windows operating systems for example, $V_h$ is indicated by a label of the form X: where X can be any single alphabet letter. Note that whereas for convenience of explanation the application viewable volume is indicated on a seemingly physical connection linking the host to the volume (see "Drive a:" in FIG. 2), the application viewable volume is of course a logical entity allowing the application to access volume.

Reverting now to FIG. 1, whenever an application wants to address a given volume for accessing data, it must request the storage manager 107 to allocate an ITL for associating a given initiator port of the application in the host to a target port of the designated volume in the virtual external memory. The application will access the specified given volume by means of the application viewable volume $V_h$.

Bearing this in mind, attention is drawn to FIG. 3 showing a flow chart illustrating a sequence of ITL provisioning for accessing data in volumes of external virtual memory, in accordance with a prior art system.

Thus, in stage 301 a volume $V_s$ is created on the external storage system. This operation is typically executed by a storage administrator (say 107 of FIG. 1) on the external storage.

Then in 302, an ITL (that was created by the storage administrator 107) is associated to the volume. This provisioning of ITL is typically executed by a storage administrator (107) and includes attaching the target port of the volume to the so generated LUN as well as attaching the LUN to the initiator port of the host. Note that the specified attachment typically involves human intervention (at storage administrator end) in order to permit the specified attachment of the LUN.

Then, in 303 the ITL is associated with $V_h$ (application viewable volume) allowing the application to view the volume. This operation is typically executed at the host (e.g. automatically by the operating system or by the host manager such as 103-$i$ associated with the respective host, see FIG. 1). As specified above, the host viewable volume $V_h$ is for instance, in the case of MS operating system, indicated by a label of the form X: where X can be any single alphabet letter. At stage 304, $V_h$ is associated to the application. This may be implemented by the host administrator (say 103-$i$ of FIG. 2). The application on the host can now utilize $V_h$ as a handle through which it can access data (e.g. read, write) on volume $V_s$. Normally, security rules are imposed by the storage manager for instance only if the volume $V_s$ is a representative of a given snapshot of an application's primary volume of data, then the application can access the desired volume $V_s$ (through the respective $V_h$) and read the snapshot data or write data thereto.

In should be noted that logical volumes may be created automatically e.g. in accordance with a policy prescribed by the storage manager, for instance in the case of volumes which hold snapshots. Note that, in particular, in cases where a very large number of snapshots is to be maintained, this may entail that a very large number of snapshots for a particular volume exist whereas the application normally accesses very few snapshots at a time (out of the large number of created snapshots).

Thus, for each created snapshot, the whole provisioning cycle discussed above is executed involving the storage manager (e.g. 107 of FIG. 1 including human intervention—as discussed above) obviously posing an undue overhead when the number of snapshots is large. This stems from the fact that storage resources and access to storage is typically managed by a storage administrator, while application access to storage is managed by a host administrator. Accordingly in many prior art systems, in the provisioning procedure, an automatic generation of snapshots may be inhibited and moreover, external storage has to maintain an unnecessarily large number of ITLs, since applications access very few (if at all) snapshots at a time. In addition, the host has to maintain an unnecessarily large number of $V_h$ host viewable volumes which are generated in accordance with the created snapshots, notwithstanding the fact that the host accesses one or only a few (if any) concurrently.

It should be also noted that whilst the snapshots reside in volumes of external virtual memory such as 104-2 of FIG. 2, this has nothing to do with the actual storage of the data in physical storage. For a better understanding of the foregoing, attention is drawn to FIG. 4 which illustrates schematically, mapping between the virtual and physical storage according to the prior art. Thus, as shown, virtual storage system 41 includes volumes 42, 43 and 44 which are mapped to physical storage disks of physical storage system 45. Thus, in this example, the physical storage includes disks 46 to 49. As shown by way of example only data chunks 42a and 42b in volume 42 may be mapped through pointers 401 and 402 (of mapping scheme 400) to different physical locations (cluster 46a of physical disk 46 and cluster 47a of physical disk 47). Reverting to FIGS. 1 to 3 above, when an application accesses through a given LUN data item(s) in a volume of external virtual memory, the data actually resides in a physical storage that is transparent to the application. Any write operation to a volume representing a snapshot will be reflected in a known per se manner in the physical storage actually storing the snapshot data.

Prior art references considered to be relevant as a background to the presently disclosed subject matter are listed below. Acknowledgement of the references herein is not to be inferred as meaning that these are in any way relevant to the patentability of the presently disclosed subject matter disclosed herein:

WO 2010/085228 entitled "Method and System for Dynamic Storage Tiering Using Allocate-On-Write Snapshots" discloses a system and method for dynamic storage tiering including creating a point-in-time copy of a virtual volume including a storage hot-spot, copying a virtual volume segment including the hot-spot from a first storage pool to a second storage pool and reconfiguring a logical block address mapping of the virtual volume to reference the virtual volume segment copy in the second storage pool.

U.S. Pat. No. 7,275,103 entitled "Storage path optimization for SANs" discloses embodiments of a system and method for rule-based proactive storage path optimization for SANs. Embodiments may evaluate paths between an application and its storage on a SAN based on current and/or historical path quality of service. Performance of alternative paths may be monitored to determine if a better path than a path currently in use is available. If a better path is determined, then the path may be switched to the better path. In one embodiment, one or more zones may be reconfigured to migrate to a different path. Path migration may be performed automatically without user intervention. Alternatively, a user may be given the option to manually migrate to a new path. Embodiments may proactively change paths between an application and its storage before path performance becomes a problem. Embodiments may be integrated with a SAN management system or, alternatively, may be standalone mechanisms.

US 2004/0068636 entitled "Virtual storage systems, virtual storage methods and methods of over committing a virtual raid storage system" discloses virtual storage systems, virtual storage methods and methods of over committing a virtual RAID storage system. According to one aspect, a virtual storage system includes a virtual storage space, a physical storage space, a mapping system configured to associate a plurality of addresses of the virtual storage space with respective addresses of the physical storage space and a controller configured to automatically remove a portion of the mapping system according to a prioritization protocol which specifies removal of portions of the mapping system according to an order.

There is a need in the art for providing a new system and method for accessing data in an external virtual memory.

SUMMARY OF THE INVENTION

In accordance with an aspect of the presently disclosed subject matter, there is provided a method for accessing volumes, including: (a) provisioning by a storage system to a host, a place holder handle configured for allowing access to any volume selected by the host and allowed to be accessed by the host, wherein the volume forms part of accessible volumes included in the storage system; (b) receiving from the host a first request for associating the place holder handle with a first selected volume from among the accessible volumes; (c) enabling the host to access the first selected volume in response to receiving an access request indicative of the place holder handle.

In accordance with an embodiment of the presently disclosed subject matter, the method further includes: receiving from the host a second request for associating the place holder handle with a second selected volume from among said accessible volumes; and responsive to receiving a second access request indicative of the place holder handle, enabling the host to access the second selected volume.

In accordance with an embodiment of the presently disclosed subject matter, the method further includes denying the access request if received before the reception of the first request for associating the place holder handle with the first selected volume.

In accordance with an embodiment of the presently disclosed subject matter, the method further includes denying the first request if received from a second host that is different from the host that was provisioned with the place holder handle.

In accordance with an embodiment of the presently disclosed subject matter, the first request is received via an in-band data path.

In accordance with an embodiment of the presently disclosed subject matter, wherein the first request and the access request are received via a same data path.

In accordance with an embodiment of the presently disclosed subject matter, wherein the first request is a SCSI command.

In accordance with an aspect of the presently disclosed subject matter, there is further provided a storage system for accessing volumes, including: (i) a storage controller configured to provision to a host, a place holder handle configured for allowing access to any volume selected by the host and allowed to be accessed by the host, wherein the volume forms part of accessible volumes included in said storage system; (ii) a data communication interface, coupled to the storage controller, for receiving from the host a first request for associating the place holder handle with a first selected volume from among the accessible volumes; the storage controller is further configured to enable the host to access the first selected volume in response to a reception of an access request indicative of the place holder handle.

In accordance with an embodiment of the presently disclosed subject matter, the storage system is configured to receive from the host a second request for associating the place holder handle to a second selected volume from among said accessible volumes; and responsive to a reception of a second access request indicative of the place holder handle, to enable the host to access the second selected volume.

In accordance with an embodiment of the presently disclosed subject matter, the storage system is configured to deny the access request if received before the reception of the first request for associating the place holder handle to the first selected volume.

In accordance with an embodiment of the presently disclosed subject matter, the storage system is configured to deny the first request if received from a second host that is different from the host that was provisioned with the place holder handle.

In accordance with an embodiment of the presently disclosed subject matter, the first request is received via an in-band data path supported by the data communication interface.

In accordance with an embodiment of the presently disclosed subject matter, the first request and the access request are received via a same data path supported by the data communication interface.

In accordance with an embodiment of the presently disclosed subject matter, the data communication interface is a SCSI (Small Computer System Interface) port and the first request is a SCSI command.

In accordance with an aspect of the presently disclosed subject matter, there is still further provided a method for accessing volumes, including: (a) provisioning by a storage system to a host, a place holder handle configured for allowing access to any volume selected by the host from a certain volume family that includes an original volume and derived volumes; (b) receiving from the host a first request for associating the place holder handle with a first selected volume from the certain volume family; (c) enabling the host to access the first selected volume in response to receiving an access request indicative of the place holder handle.

In accordance with an embodiment of the presently disclosed subject matter, the derived volumes are selected from snapshots and clones of the original volume.

In accordance with an embodiment of the presently disclosed subject matter, the first selected volume is a snapshot of the original volume.

In accordance with an embodiment of the presently disclosed subject matter, the first selected volume is a snapshot that was created from the original volume after the provisioning of the place holder volume.

In accordance with an embodiment of the presently disclosed subject matter, the method further includes denying requests for associating the place holder handle with a volume that is not included in the certain volume family.

In accordance with an embodiment of the presently disclosed subject matter, the step of provisioning further includes associating the place holder handle with access permissions for accessing the original volume by the host; and wherein the method includes using the access permissions for enabling the access to the first selected volume.

BRIEF DESCRIPTION OF THE DRAWINGS

In order to understand the presently disclosed subject matter and to see how it may be carried out in practice, embodiments will now be described, by way of non-limiting example only, with reference to the accompanying drawings, in which:

FIGS. 11A and 11B illustrate a schematic handle table managed by a storage system, in accordance with a certain embodiment of the presently disclosed subject matter;

FIG. 13 illustrates a sequence of operations for accessing logical volumes, in accordance with another embodiment of the presently disclosed subject matter.

DETAILED DESCRIPTION

Figure 1:
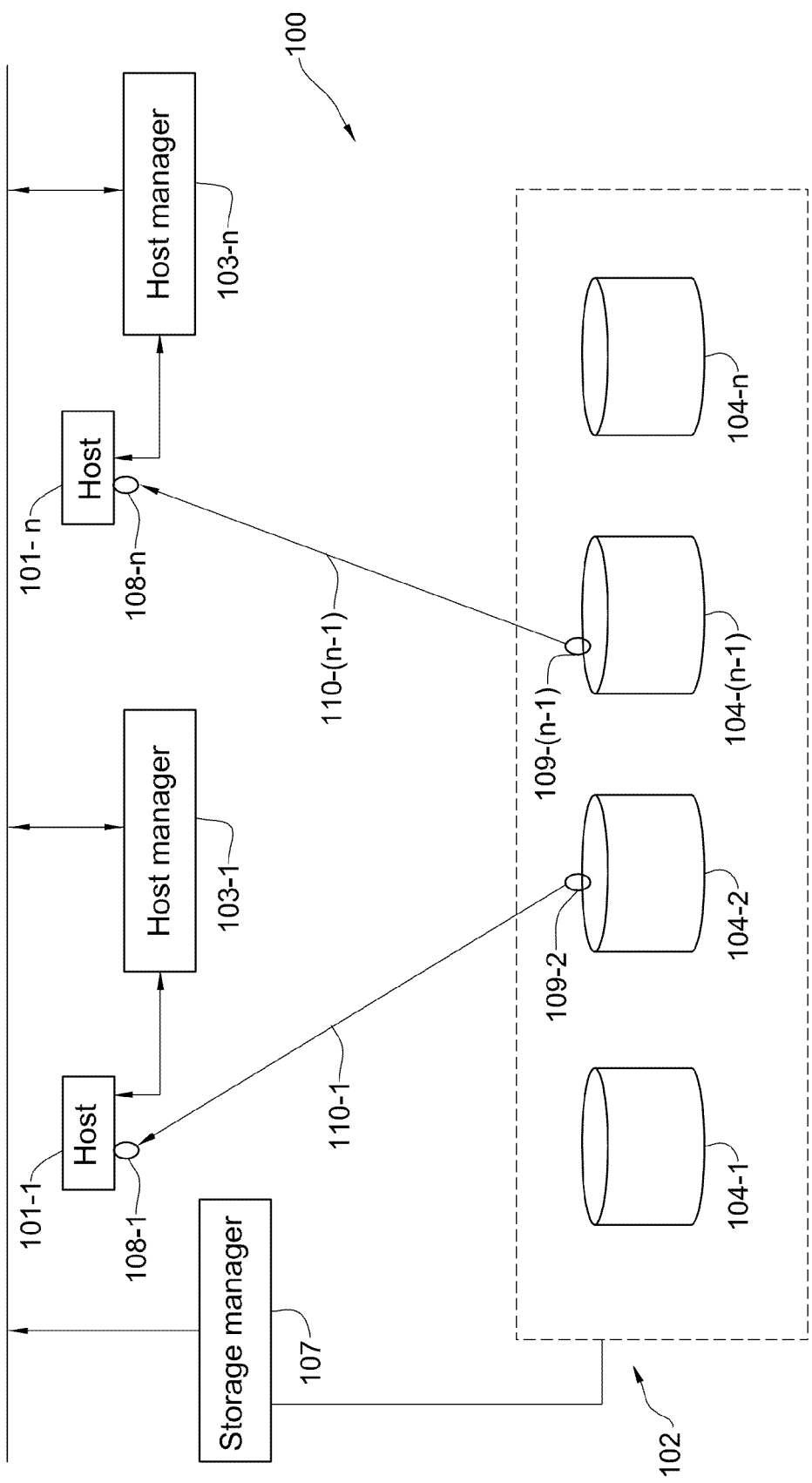
FIG. 1 is a schematic illustration of an exemplary prior art system for accessing data in an external virtual memory.
Figure 2:
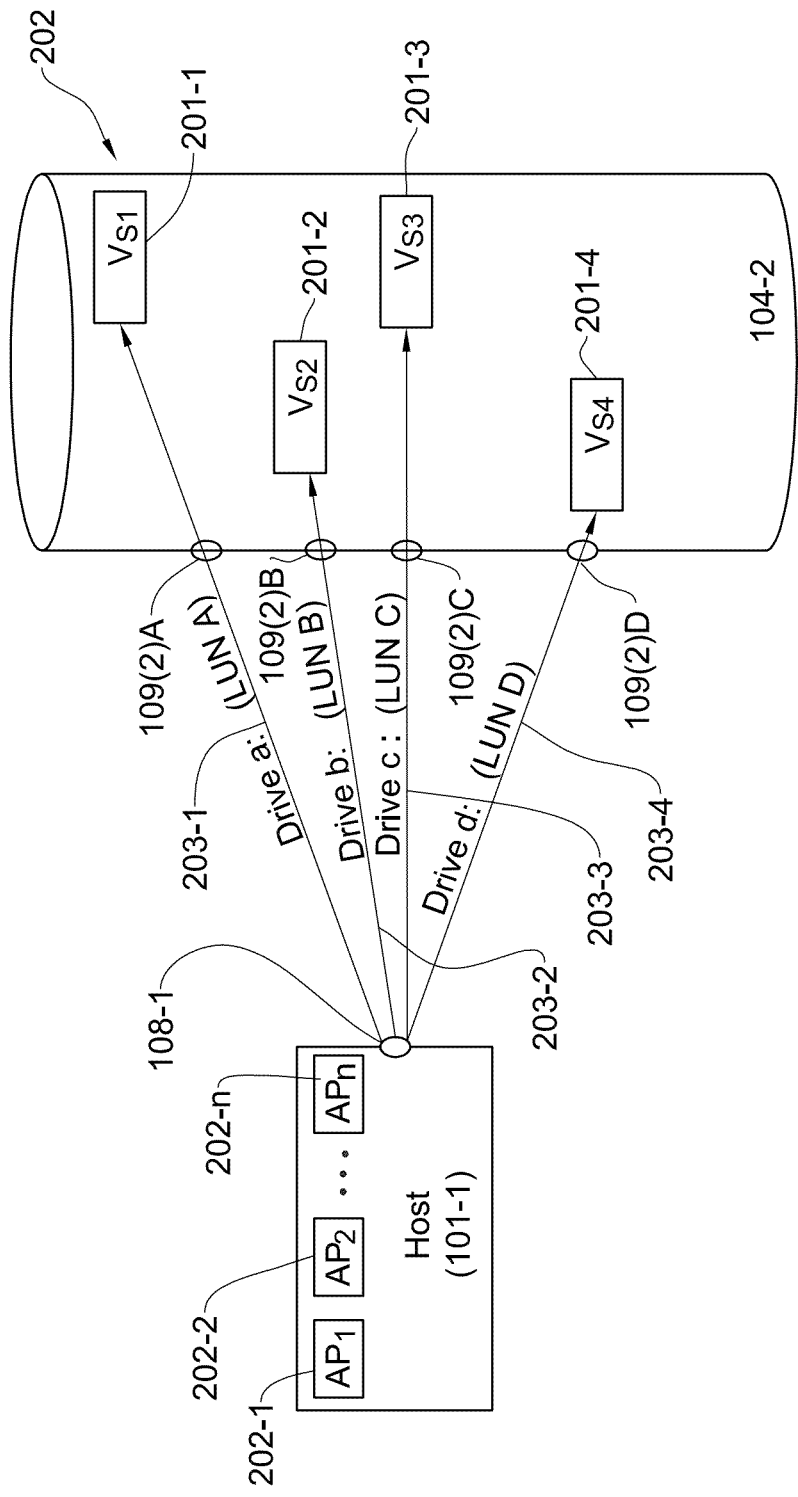
FIG. 2 is a schematic illustration of a host associated with a few volumes by means of corresponding ITLs, in the system of FIG. 1.
Figure 3:
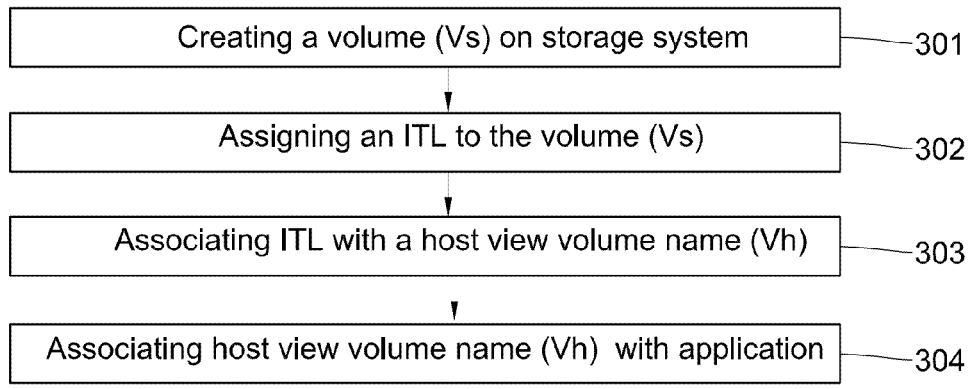
FIG. 3 is a flow chart illustrating a sequence of ITL provisioning, for accessing data in external virtual memory, in accordance with a prior art system.
Figure 4:
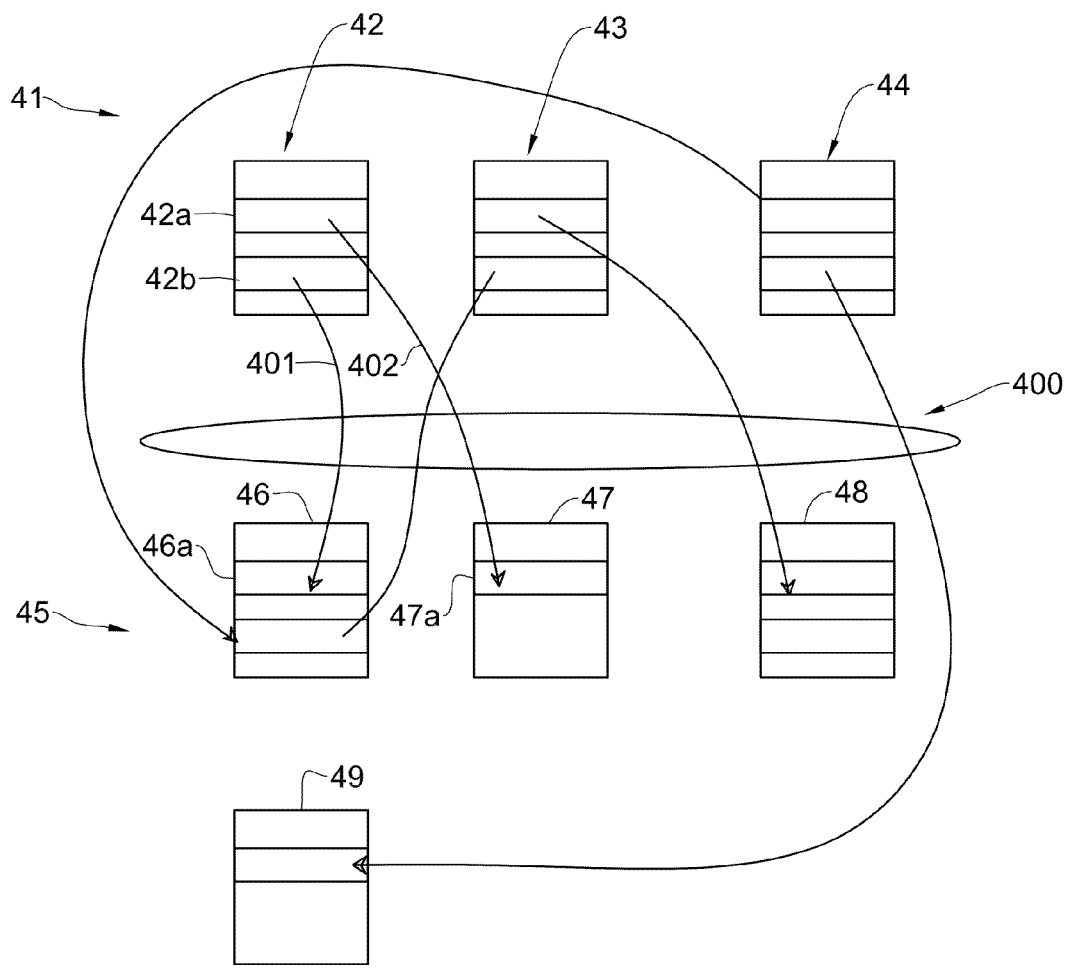
FIG. 4 illustrates, schematically, mapping between virtual and physical storages, in accordance with the prior art.

Note that in the drawings and descriptions, identical reference numerals indicate those components or stages that are common to different examples.

Unless specifically stated otherwise, as apparent from the following discussions, it is appreciated that throughout the specification discussions utilizing terms such as receiving, provisioning, accessing, associating, attaching, identifying, detaching, reading, writing, creating or the like, include action and/or processes of a computer that manipulate and/or transform data into other data, said data represented as physical quantities, e.g. such as electronic quantities, and/or said data representing the physical objects.

Note that unless stated otherwise, in addition to or instead of what may be construed from the description herein, all technical and scientific terms used herein may have the same meaning as understood by one of ordinary skill in the art.

The operations of the host, host manager, storage manager and volume management module in accordance with the teachings herein may be performed by a computer specially constructed for the desired purposes or by a general purpose computer specially configured for the desired purpose by a computer program stored in a computer readable storage medium.

In accordance with certain embodiments of the presently disclosed subject matter, and as will be exemplified in greater detail below, there is provided an efficient method and system for snapshot provisioning in particular when a large number of snapshots are being created. The host manager can efficiently provide snapshots to applications minimizing the number of ITLs and the number of $V_h$ volumes, for instance according to the number of snapshots that should be accessed concurrently.

In accordance with certain embodiments of the presently disclosed subject matter, there is provided a method and system which separates between snapshot creation (still performed by storage administrator, say 107 of FIG. 1) and snapshot provisioning (performed e.g. by host manager 103) allowing automation of the snapshot creation process.

Figure 5A:
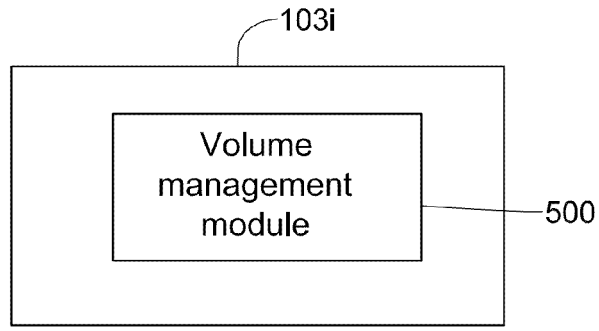
FIG. 5A illustrates a generalized block diagram of a host manager, in accordance with certain embodiments of the presently disclosed subject matter.

Bearing all this in mind, attention is now drawn to FIG. 5A depicting a generalized block diagram of a host manager, in accordance with certain embodiments of the presently disclosed subject matter. Thus, the host manager 103-i accommodates a volume manager for managing volumes (such as attaching to or detaching from a volume), in a manner that will be described in greater detail below. The presently disclosed subject matter is not bound by the block diagram structure of FIG. 5A.

Figure 5B:
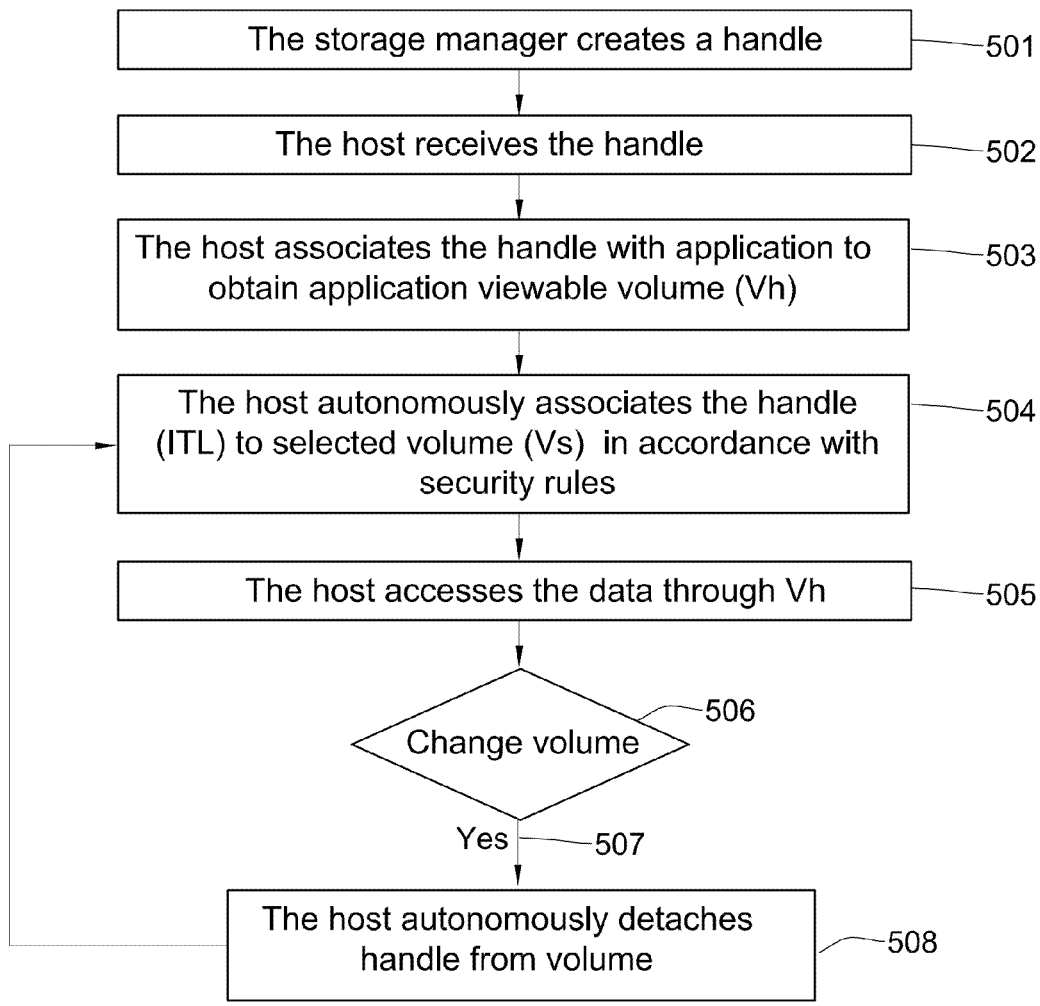
FIG. 5B illustrates a sequence of operations of provisioning a handle for accessing data in an external virtual memory, in accordance with a certain embodiment of the presently disclosed subject matter.

FIG. 5B illustrates a sequence of operations of provisioning a handle for accessing data in an external virtual memory, in accordance with a certain embodiment of the presently disclosed subject matter. The operational stages of FIG. 5B may be implemented for example by the volume management module 500 of FIG. 5A.

At stage 501, the storage manager creates a unique handle or handles (including a unique LUN) that will enable the host to access volumes on an external virtual memory. If desired, more than one handle is provided if the host requires to access more than one volume (e.g. snapshot) concurrently.

At stage 502, the host manager receives from a storage manager the created unique handle (or handles) for provisioning of access to volume(s) by the host.

At stage 503, the host manager associates the handle to an application so as to obtain an application viewed volume name (denoted $V_h$).

At stage 504, the host manager provisions the handle to a selected volume by associating (attaching) the handle from a desired initiator port at the host side, to a target port of a selected volume from among the accessible volumes through the specified unique LUN. The selected volume must comply with security rules, for instance, only if the selected volume is representative of a given snapshot of a primary volume of data associated with the host, then the application can access the selected volume (representative of the snapshot of interest). Access in accordance with certain embodiments includes reading data from the volume (indicative of the snapshot) and/or writing data thereto.

At stage 505, the application of the host accesses the selected volume through the application viewed volume name $V_h$.

In cases where the application wishes to access another volume (stages 506 and 507), the host manager autonomously provisions the handle to another selected volume. This includes detaching the handle from the specified volume 508, and attaching it to the other desired volume (reverting to stage 504, this time with a different volume). Obviously the attachment to another selected volume should also comply with the specified security rules. Note that the application will utilize the application viewable volume $V_h$ (provided thereto at stage 503) for accessing the desired volume.

In accordance with certain embodiments, the storage manager can create more than one handle for each host (or application), allowing thus simultaneous access from the host to corresponding at least two volumes. The provisioning of each of the specified handles is as described with reference to FIG. 5, above.

In accordance with a certain embodiment, the security rules include:
(i) Host manager cannot grant access to storage volumes other than to snapshot volumes which are snapshots of volumes it has access to already; and
(ii) Space allocation to snapshots and snapshot creation itself is controlled by the storage manager.

Note that the specified security rules are by no means binding and may vary depending upon the particular implementation.

Figure 6A:
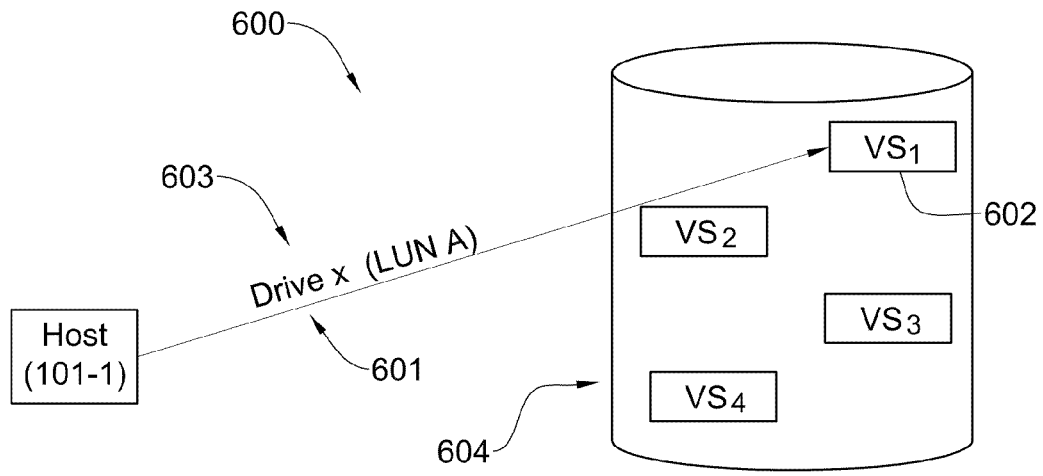
FIGS. 6A-B illustrate graphically provisioning of a handle, in accordance with certain embodiments of the presently disclosed subject matter.
Figure 6B:
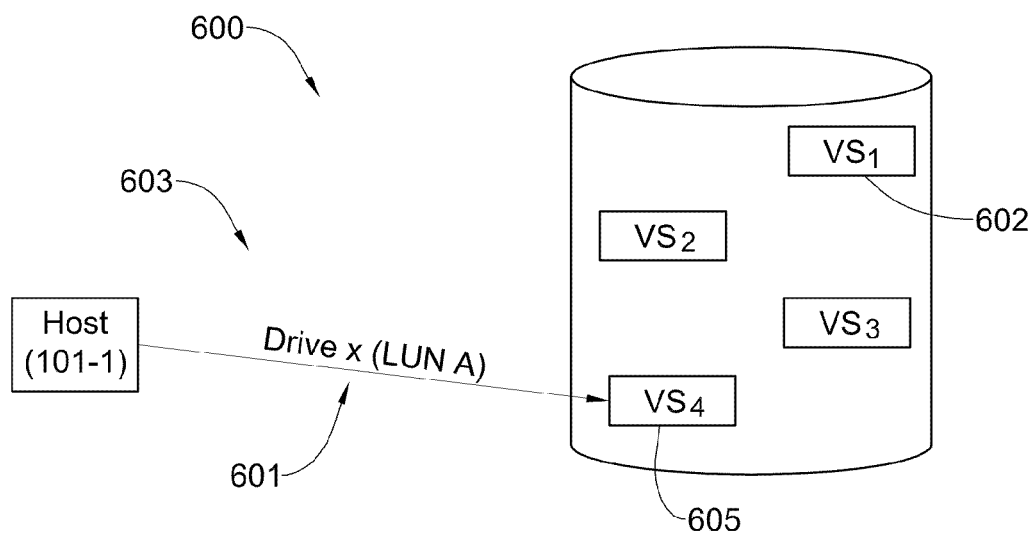

Attention is now directed to FIGS. 6A-B illustrating handle provisioning, in accordance with certain embodiments of the presently disclosed subject matter. Thus, in FIG. 6A, the host manager (not shown) provisions handle 601 for association between an application in the host 101-1 to a given volume. The handle 601 is identified by the application as application viewed volume name (labeled by this example as a Drive: X 603, where X being representative of an alphabetic letter)— see e.g. stage 503 of FIG. 5. The volume $V_{s1}$ 602 of virtual memory 604 is accessed through handle (ITL). The handle is identified by a unique LUN (designated in FIG. 6A as $LUN_A$) and the application in the host accesses the specified volume $V_{s1}$ 602 through a host viewable volume (labeled as X: 603). Note that the unique LUN and the application viewable volume (labeled as X: are both logical and do not stand for a physical link.

Turning now to FIG. 6B, in cases where the application seeks to access a different volume, say $V_{s4}$ 605 (which complies with security rules discussed above), the host manager will provide the required connection, which includes detaching the handle 601 (connection) from volume $V_{s1}$ 602 and re-attaching it to a different volume designated as $V_{s4}$ 605. From the standpoint of the application, the latter will access the newly attached volume utilizing the same application viewable volume $V_h$ (identified by the same label Drive X: 603) and using the same unique $LUN_A$ of the specified handle 601.

Note that in accordance with certain embodiments, where an application or host wishes to access more than one volume concurrently, then the storage module may create and assign to the host corresponding more than one handle (identified by the host applications by respective applications viewable volume labels, such as X:, Y: etc.). This will allow access to each volume through the respective handle. Thus, for example, an application can access a given snapshot through application viewable volume name X: and concurrently access a different snapshot utilizing the other unique application viewable volume name that is assigned thereto Y:.

It is accordingly appreciated that in accordance with certain embodiments of the presently disclosed subject matter, there is provided a handle provisioning method e.g. for allowing applications to access volumes (e.g. representing snapshots) such that:
(1) The number of ITLs that need to be maintained is that of the number of snapshot volumes that need to be accessed concurrently rather than the number of snapshots in a given volume.
(2) The number of $V_h$ volumes that need to be maintained is that of the number of snapshot volumes that need to be accessed concurrently by the application rather than the number of snapshots in a given volume.
(3) The number of operations that storage administrator has to perform to create a handle (and which will be utilized by the host for provisioning access to snapshots) is proportional to the number of snapshot volumes that need to be accessed concurrently by the application rather than the number of snapshots in the storage system.
(4) The number of operations that host administrator has to perform to provision a snapshot to an application is proportional to the number of snapshot volumes that need to be accessed concurrently by the application rather than the number of snapshots in a volume.

Figure 7:
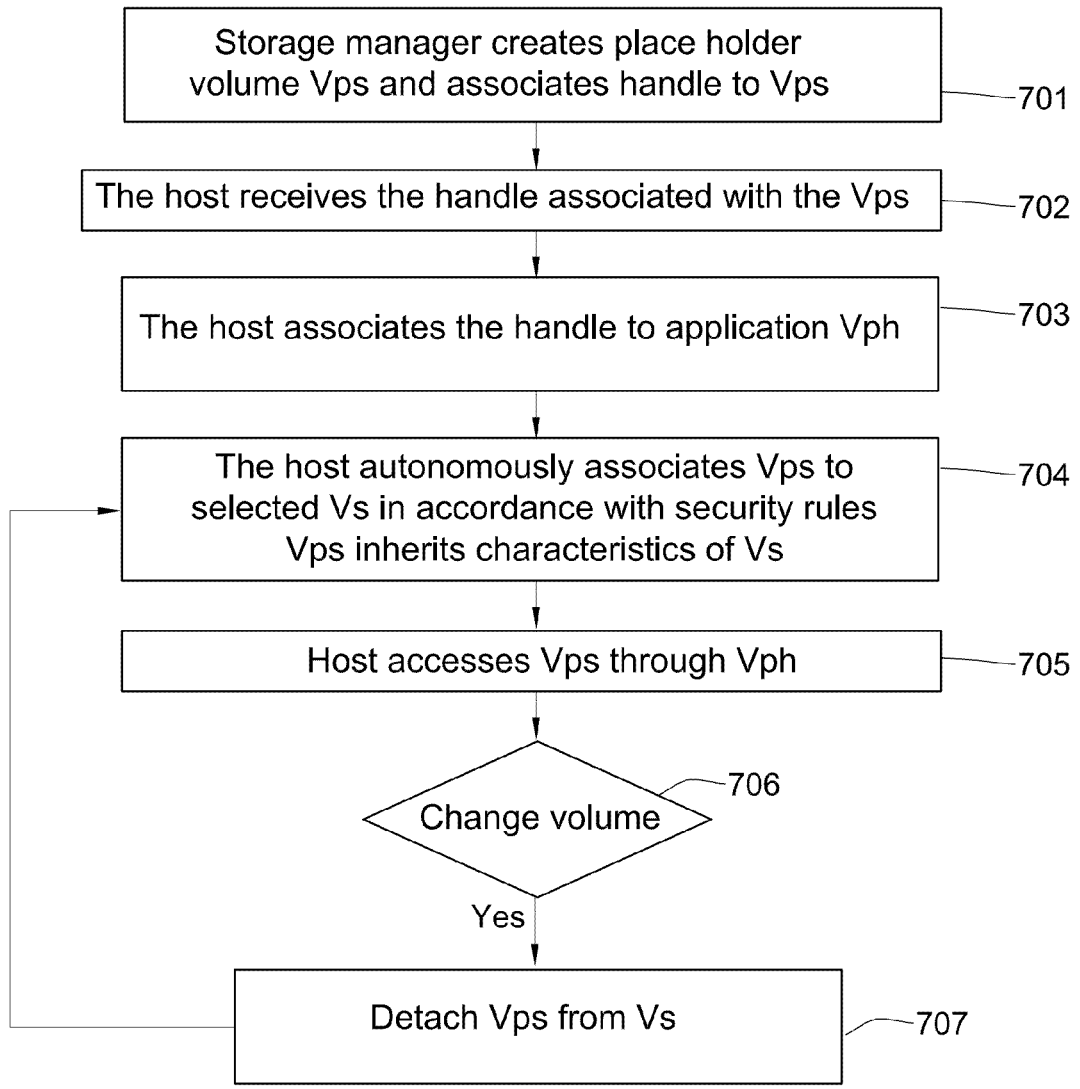
FIG. 7 illustrates a sequence of operations of provisioning a handle for accessing data in an external virtual memory, in accordance with a certain embodiment of the presently disclosed subject matter.
Figure 8:
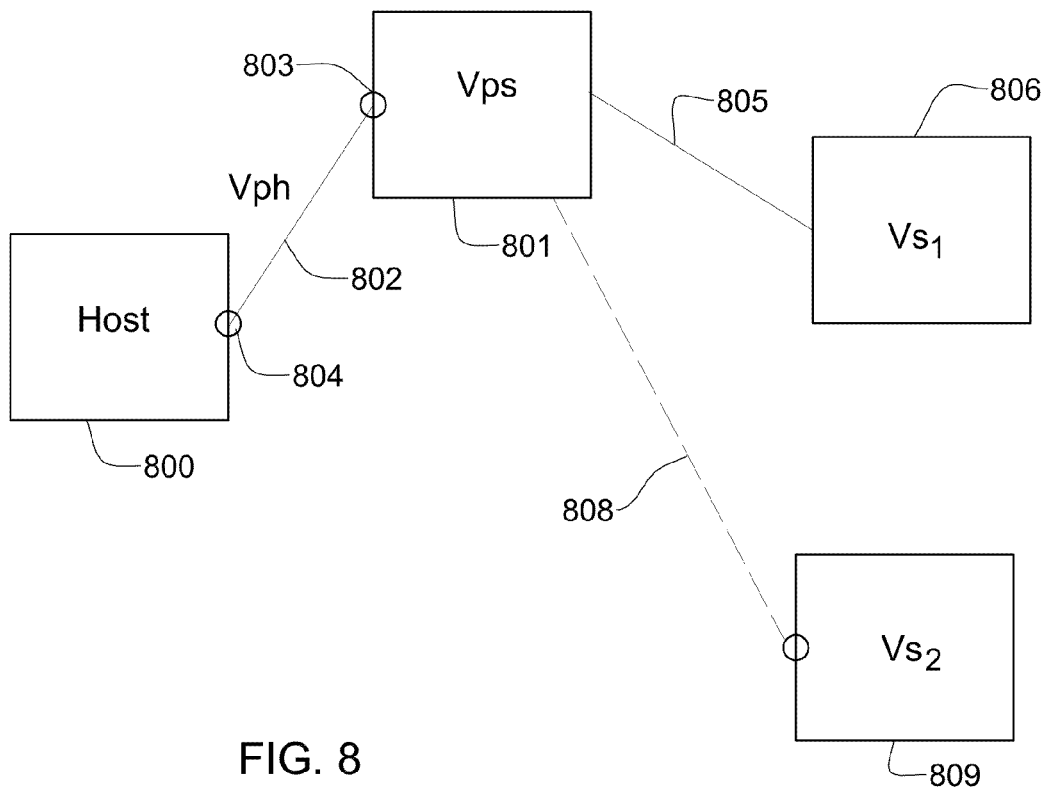
FIG. 8 illustrates graphically provisioning of a handle, in accordance with the embodiment of FIG. 7.

Turning now to FIG. 7, it illustrates a sequence of operations for provisioning a handle, for accessing data in an external virtual memory in accordance with a certain embodiment of the presently disclosed subject matter, and to FIG. 8 illustrating, graphically, provisioning of a handle, in accordance with the embodiment of FIG. 7.

In accordance with this embodiment, the storage manager (e.g. 107 of FIG. 1) creates (701) a new type of volume denoted place holder volume $V_{ps}$ (see e.g. 801 of FIG. 8). The characteristics of $V_{ps}$ are in accordance with certain embodiments, as follows:
1. Each $V_{ps}$ in the system is uniquely identified by volume name and/or by some unique Global Unit ID (GUID) like every other volume in the system
2. There is no space allocated to $V_{ps}$ volumes; its size is zero. In accordance with other embodiments it may have a different value.
Each $V_{ps}$ may be associated with a set of ITLs through which it facilitates access to a set of hosts like a regular volume $V_s$. For instance, in cases where a few applications (each associated with a respective initiator port of a host) wish to access a common volume (utilizing to this end the specified place holder volume $V_{ps}$), there will be allocated a few ITLs for the $V_{ps}$.
3. Although $V_{ps}$ may be associated with a set of ITLs, the storage manager will honor only query SCSI commands to this volume; otherwise it returns a status of "volume offline" i.e. no read/write operations can be performed to $V_{ps}$. This situation is changed when a specific operation to be later discussed is performed on the volume.
4. $V_{ps}$ volumes are visible also through storage manager particular management commands (CLI) and GUI.
5. $V_{ps}$ volumes are associated on the host side with corresponding $V_{ph}$ As readily noted from characteristic 3 above, the storage manager generates one or more unique handles (e.g. ITLs) (see, for example, 802 of FIG. 8) and associates the handle or handles to the place holder volume (e.g. handle 802 is associated to the place holder 802 through target port 803).

Reverting to FIG. 7, in step 702, the host (e.g. host manager associated with host 101-1 of FIG. 1) receives the handle (e.g. 802) and associates the host side with corresponding application viewable handle $V_{ph}$ (step 703) e.g. in Windows® operating system an alphabetic character, allowing the application to access the place holder volume $V_{ps}$. Note that the association of the handle 802 to the host (through initiator port 804 and to $V_{ps}$ 801 through target port 803) is performed by the storage manager. The Unique LUN of handle 802 is viewable from $V_{ps}$. As specified above, the LUN and the application viewable handle label (X:) are logical entities and do not stand for a physical link.

Note also that at this stage, when the host accesses the place holder volume 801, an error status (e.g. "volume off-line") is returned considering that the place holder volume 801 is not as yet attached to any of the volumes ($V_{si}$), all as will be discussed in greater detail below.

Turning now to step 704, the host attaches the place holder volume $V_{ps}$ to a selected volume $V_{si}$ in compliance with security rules, as will be described in greater detail below. Thus, for example, and as shown in FIG. 8, the host attaches (805) volume $V_{ps}$ (803) to volume $V_{S1}$ 806, and consequently $V_{ps}$ inherits all properties of $V_s$, i.e. it assumes the size and GUID of $V_s$.

By $V_{ps}$ inheriting the properties of $V_{si}$, the host is practically associated to the selected volume $V_s$, since $V_{ps}$ has inherited characteristics that by this embodiment include the volume size of $V_{si}$. Note that the connection between $V_{ps}$ and $V_{si}$ is logical, and accordingly once inheriting the characteristic of the specified $V_{si}$, the host can access the latter volume through the target port 803 that is attached to $V_{ps}$.

The host now accesses 705 (e.g. read and or write) the volume through the $V_{ph}$ associated with the $V_{ps}$ that has inherited the properties of $V_{s1}$. Access includes by one example read from and/or write to the volume.

If the host wishes to access a different volume 706 (in accordance with the security rules prescribed by the storage manager), it detaches the handle from the previous volume and reattaches it to another volume. By this embodiment, the volume detaches the connection between $V_{ps}$ and $V_{si}$ 707 and attaches $V_{ps}$ to a different volume (in compliance with the security rules) say $V_{s2}$ (704). Accordingly, $V_{ps}$ will inherit the characteristics of $V_{s2}$ (e.g. in accordance with certain embodiments, the volume size) and now the host can access $V_{s2}$ through $V_{ph}$ (which, as may be recalled, is fixedly associated to $V_{ps}$) This is illustrated by way of example with reference to FIG. 8, where $V_{ps}$ is attached (808) to $V_{s2}$ (809).

Having explained an exemplary sequence of operations with reference to FIGS. 7 and 8, there follows a list of commands for attaching $V_{ps}$ to $V_s$, free $V_s$ and list place holders. The presently disclosed subject matter is not bound by this exemplary list of commands, which is provided for illustrative purposes only.

The following set of operations can be performed on $V_{ps}$:
1. Attach $V_{ps}$, $V_s$. This command attaches $V_{ps}$ to $V_s$. When this operation is executed the following happens.
   a. $V_{ps}$ inherits all properties of $V_s$, i.e. it assumes the size and GUID of $V_s$.
   b. $V_s$ becomes accessible to servers on all ITLs defined for $V_{ps}$. I.e. Read and write operations to the corresponding $V_{ph}$ will be directed to the $V_s$ associated with the corresponding $V_{ps}$ and will be executed based on $V_s$ access permissions (read only or read/write). Note: for some operating systems, this needs to be accompanied by a rescan command.
2. Free $V_s$. This command detachs $V_{ps}$ from $V_s$. $V_{ps}$ returns to its original state as specified in the beginning of this section and the access it facilitated to $V_s$ is lost
3. List place_holders. This command lists $V_{ps}$ volumes. List all $V_{ps}$ their GUID and ITLs and, if associated, the GUID and size of the corresponding $V_s$.

In accordance with certain embodiments, the host has permitted actions, for instance (i) list all $V_{PS}$ which may include receiving also the handle identification (input port, target port and dedicated LUN) as well as volume ($V_{si}$) size that is attached to the $V_{ps}$, or volume off-line in cases where the $V_{ps}$ is not attached to any of the volumes.

Note that there may be more than one $V_{ps}$ allocated by the storage manager to the host, facilitating thus access of the host to a few volumes concurrently. For example, there may be hundreds of volumes (each with hundreds of snapshots) but perhaps only few of the specified volumes may be accessed concurrently and accordingly a given number of will will be allocated by the storage manager for facilitating concurrent access to a given number of volumes.

Turning to the security rules, in accordance with certain embodiments, they include the following:

(i) The creation of $V_{ps}$ volumes can be performed by invoking appropriate command(s) at the storage manager console and by permission of the storage manager (e.g. 107 of FIG. 1)

(ii) The attach and detach commands can be executed at the host side through inbound CLI and are subject to the following conditions:
  a. CLI can be directed only to $V_{ph}$ visible by the host
  b. Attachment (between $V_{ps}$ and selected $V_{si}$) can only be made to those volumes which comply with a given rule, for instance only to $V_{si}$ representing a snapshot of the primary volume accessible by the host. This may be implemented for instance by allowing attachment only if the I part (of an ITLs of $V_{ps}$–) is the same as the I part of one of the ITLs of a volume representing a snapshot of a primary volume accessible by the host.

Note that the specified security rules are by no means binding and may vary depending upon the particular implementation.

Figure 9:
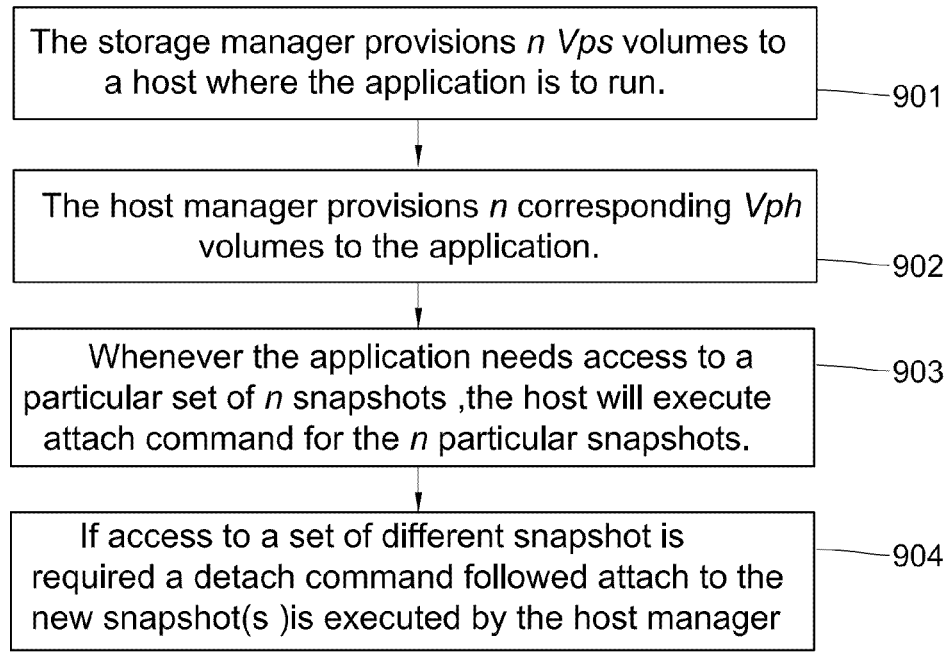
FIG. 9 illustrates a sequence of operations for dynamically associating a small number of n snapshots to an application, in accordance with a certain embodiment of the presently disclosed subject matter.

There follows a description of a sequence of operations with reference to FIG. 9, for dynamically associating a small number of n snapshots to an application, in accordance with a certain embodiment of the presently disclosed subject matter.

In step 901 the storage manager provisions n Vps volumes to a host where the application is to run.

In step 902 the host manager provisions n corresponding $V_{ph}$ volumes to the application.

Whenever the application needs access to a particular set of n snapshots the host (some applications with host privileges) will execute attach command for the n particular snapshots (903).

If access to a set of different snapshots is required, a detach command following the new snapshots is executed by the host manager (904).

Figure 10:
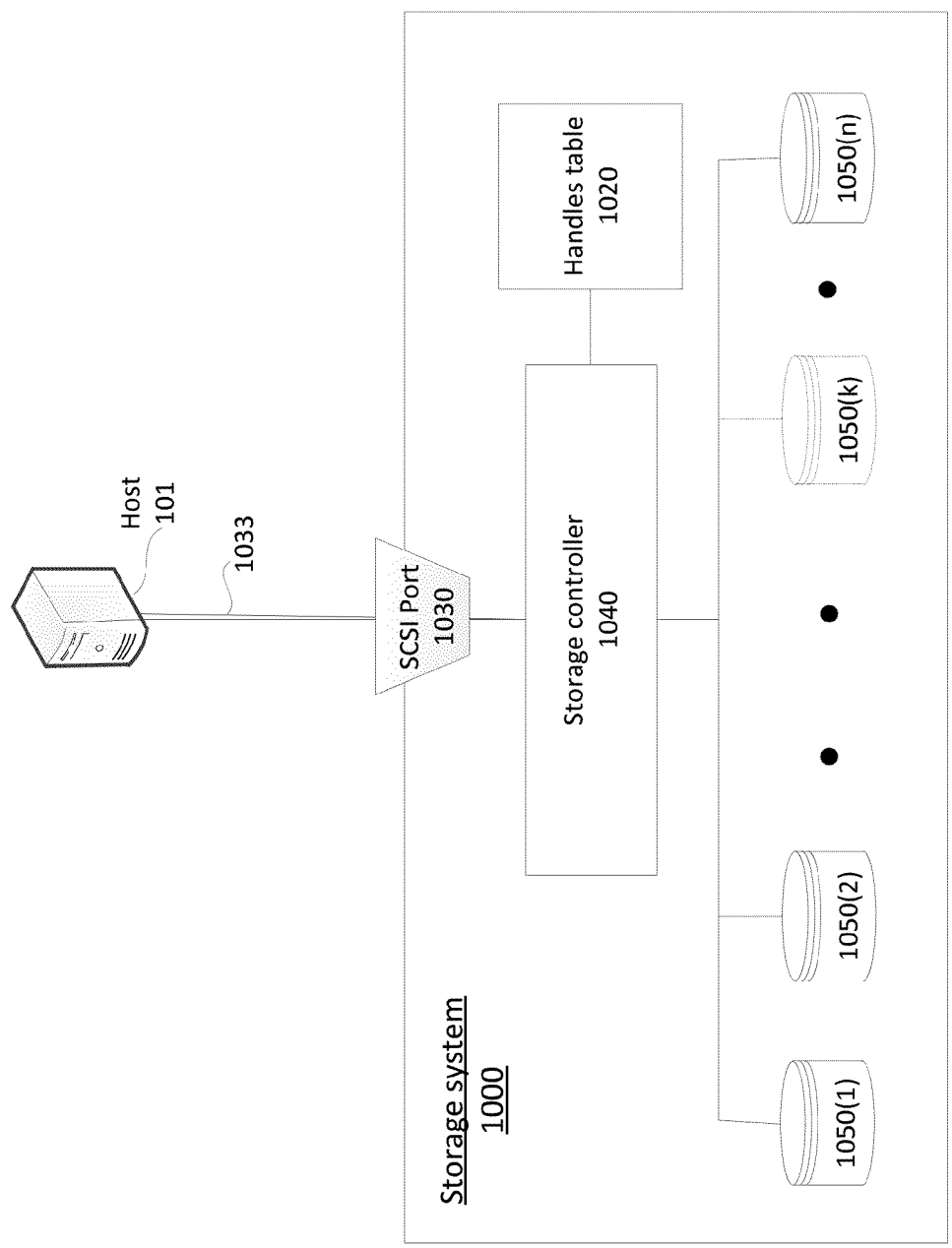
FIG. 10 illustrates a generalized block diagram of a storage system, in accordance with a certain embodiment of the presently disclosed subject matter.

FIG. 10 illustrates a storage system 1000 for allowing a host 101 to access multiple logical volumes that are allowed to be accessed by host 101 by using a place holder handle (such as handle 802) for dynamically associating different volumes with the handle. Unlike a traditional handle that is created upon a need to access a certain volume, the place holder handle is created before any logical volume is requested to be accessed and it can be associated with different logical volumes, one volume at a time. The logical volumes may be regular volumes or snapshots of volumes.

Storage system 1000 includes a storage controller 1040 configured for at least: (i) managing logical volumes 1050(1)-1050(n), (ii) provisioning place holder handles to host computers, such as host 101, (iii) associating different volumes with the same place holder handle, without needing to create a different handle each time an access to a new volume is requested, and (iv) enabling access to any volume that is currently associated with the place holder handle provided by the host in an access request. Storage controller 1040 is configured to manage a handle table 1020, containing the handles created in the system. Storage controller 1040 includes the hardware required for performing the above functionality, such as one or more processors, one or more communication controllers, memory and local storage device(s).

Storage system 1000 further includes a data communication interface coupled to storage controller 1040, such as SCSI port 1030 that can implement block-based access standards, such as Small Computer Systems Interface (SCSI) protocol encapsulated over FibreChannel or over TCP/IP/Ethernet (iSCSI). The data communication interface includes all the hardware and software required for enabling data communication coming from a data communication path, including the proper protocols and standards, as well as proper cabling and at least one connector (e.g.: a parallel SCSI, Serial Attached SCSI (SAS), optical fibre connector, Ethernet connector and the like). The data communication interface is configured to receive requests coming from the hosts, as well as responding to the hosts, via a data path, such as a network or a bus for transporting SCSI commands. The data communication interface is configured to receive, via an in-band data path, management commands from the host, e.g. a command to associate a place holder handle with a specific volume. The term in-band data path refers to a data path for transferring data and I/O commands, such as a SCSI data path 1033, that according to embodiments of the present invention, serves for transporting management commands, in addition to traditional data and I/O commands.

FIG. 11A illustrates handle table 1020 that may include both traditional handles and place holder handles. The traditional handles, once created, are statically coupled with specific logical volumes, such as handle 1021(1) that is associated, upon creation, with logical volume A 1031(1) and handle 1021(2) that is associated, upon creation, with logical volume B 1031(2). Unlike the traditional handles, a place holder handle is dynamically associated with a logical volume that may be replaced with another volume, without changing the value of the associated place holder handle. Handle 1021(3) is a place holder handle and handle type 1041(3) indicates that handle 1021(3) is a place holder handle. Handle type fields 1041(1), 1041(2) indicates that the corresponding handles are traditional handles (="regular"). The handle type may be a flag that is set to indicate a place holder handle. Any other technique for identifying a handle as a place holder handle can be used.

In FIG. 11A, no logical volume has been yet assigned to handle 1021(3), so field 1031(3) is empty (="NONE") to indicate that no volume is assigned. Alternatively, field 1031(3) can include a place holder volume, which is a dummy volume having a zero size and is not accessible. The purpose of the place holder volume is to indicate that the logical volume associated with handle 1021(3) can be changed dynamically. Handle 1021(4) is also a place holder handle, but this handle was already assigned with a logical volume C 1031(4).

Handle table 1020 may further include the accessing entity, not shown, (e.g. a host or application within the host) that requested the creation of the handle. Handle table 1020 may include other parameters, not shown, such as information related to the accessing entity, access permissions that were granted or restricted, information related to the associated logical volume, e.g. properties (size, type, etc.).

FIG. 11B illustrates handle table 1020', which is handle table 1020 after being changed. Handle 1021(3) is now assigned with a logical volume D and handle 1021(4) was disconnected from the previous assigned logical volume C and is now assigned to another logical volume E.

According to an embodiment of the presently disclosed subject matter, the place holder volume is configured to be associated with any volume selected from a certain volume family that includes an original volume, which is the ancestor of the family and its snapshots, clones or any other derived volume that descends from the original volume. Upon creation of the place holder handle, the place holder handle is associated with the certain volume family or with the original volume, e.g. volume 1050(1) and access permissions for accessing volume 1050(1) are assigned to the host requested the creation of the place holder volume. After the place holder handle is created, the host can request to associate the handle with a snapshot of volume 1050(1) (or any other volume derived from volume 1050(1)), for example volume 1050(k). Since volume 1050(k) is a snapshot of volume 1050(1), the access permission assigned to the host for accessing volume 1050(1) can be automatically assigned to the host for accessing volume 1050(k).

Figure 12:
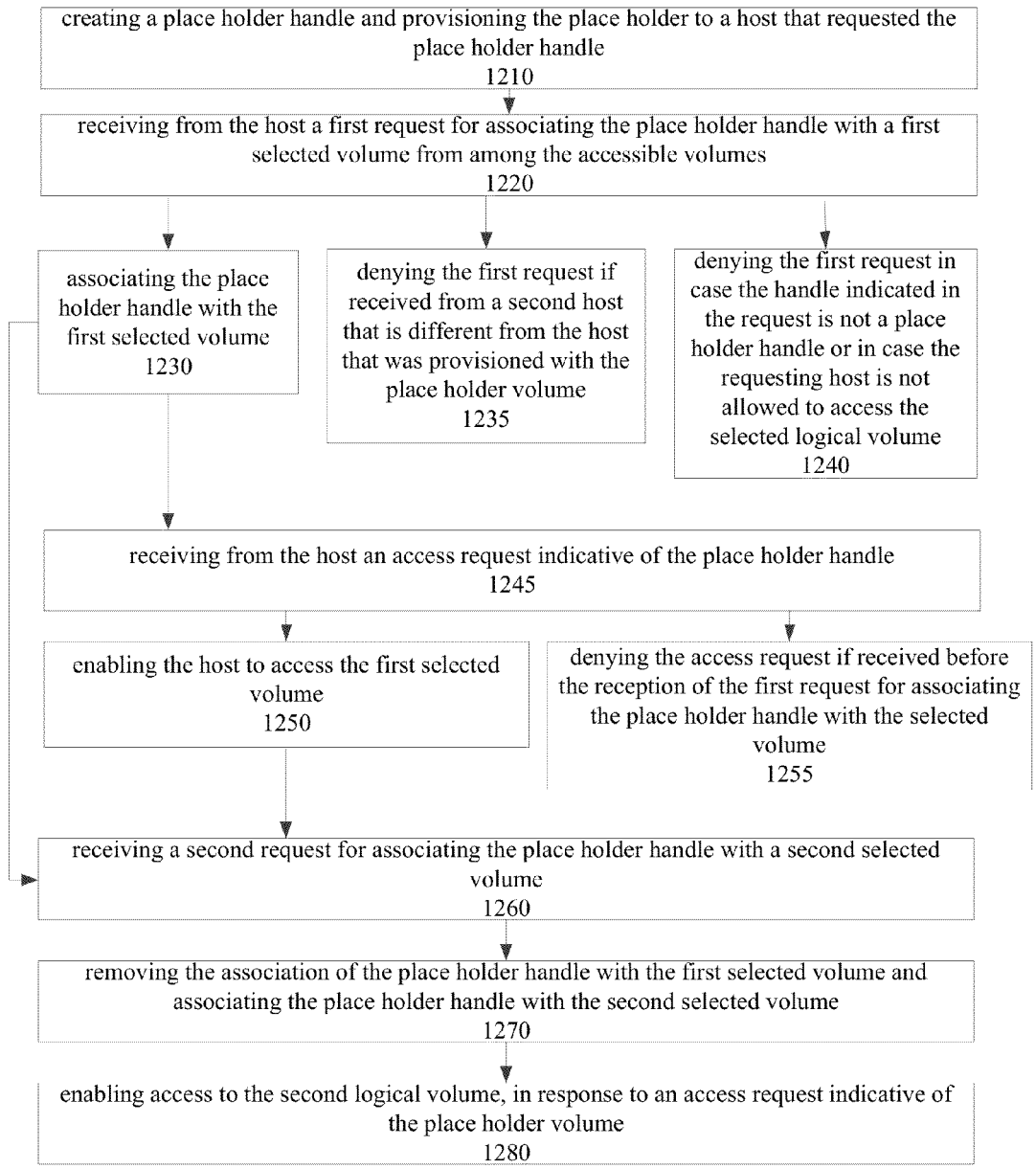
FIG. 12 illustrates a sequence of operations for accessing logical volumes, in accordance with a certain embodiment of the presently disclosed subject matter.

FIG. 12 illustrates a sequence 1200 of operations for provisioning place holder handles for dynamically associating logical volumes to the handles, according to embodiments of the presently disclosed subject matter. The operations are performed by storage system 1000, e.g. by storage controller 1040.

Sequence 1200 includes stage 1210 of creating a place holder handle and provisioning the place holder to a host that requested the place holder handle. The place holder handle is configured for allowing access to any volume selected by the host (the selection of the volume is provided later on by stage 1220) and allowed to be accessed by the host, wherein the volume forms part of accessible volumes included in the storage system. The accessible volumes may include snapshots. The creation of the place holder handle can be in response to a management command issued by a system administrator on behalf of the host or by a host administrator. The creation includes adding to the handle table the newly created handle with an indication that this is a place holder volume. At this stage, the place holder handle is not associated with any specific volume.

Stage 1210 is followed by stage 1220 of receiving from the host a first request for associating the place holder handle with a first selected volume from among the accessible volumes. The first request includes the identification (e.g. value) of the place holder handle and the identity of the first selected volume.

The first request can be received via an in-band data path and therefore the first request can conform to a data access protocol used by the host for various I/O requests. The data access protocol may be SCSI (Small Computer System Interface) and the first request may be a SCSI command, for example, Inquiry SCSI command that includes a vendor specific page (e.g. page code C0h-md FFh), OPERATION CODE is set to 12 h; EVPD (Enable Vital Product Data bit) is set to 1 to indicate that the information to be returned is not the standard INQUIRY data but instead, the PAGE CODE field specifies which page of vital product data information the device server shall return. Step 1220 may be performed by the data communication interface in conjunction with the storage controller.

Stage 1220 is followed by a stage 1230 of associating the place holder handle with the first selected volume. The association may include updating the entry of the place holder handle in the handle table with the first selected volume and optionally with any other details related to the first selected volume. Stage 1230 may include steps related to mounting the volume or any operations required to prepare the volume for access.

Alternatively, stage 1220 may be followed by a stage 1235 of denying the first request if received from a second host that is different from the host that was provisioned with the place holder volume.

Stage 1220 may also be followed by a stage 1240 of denying the first request in case the handle indicated in the request is not a place holder handle or in case the requesting host is not allowed to access the selected logical volume.

Stage 1230 is followed by a stage 1245 of receiving from the host an access request indicative of the place holder handle.

Stage 1245 is followed by a stage 1250 of enabling the host to access the first selected volume, in response to receiving the access request. The access request and the first request can be received via the same data path, e.g. both can use the network/bus that carries the SCSI protocol and connected to the SCSI port.

Alternatively, Stage 1245 can be followed by a stage 1255 of denying the access request if received before the reception of the first request for associating the place holder handle with the first selected volume.

Stage 1220 of receiving from the host a request for associating the place holder handle with a selected logical volume can be repeated with a different selected volume upon each request. Stage 1250 of enabling the host to access the previously selected volume can also be repeated and thus the enabling to access corresponds to a volume currently associated with the place holder handle. This concept is described for stage 1260.

Any of stages 1230-1250 may be followed by a stage 1260 of receiving a second request for associating the place holder handle with a second selected volume. Since at this stage the place holder volume is already associated with the first selected volume, the second request is for replacing the first selected volume that is associated with the place holder volume, with the second selected volume. The second selected volume is different from the first selected volume. The second request may conform to a data access protocol and may be a SCSI command similar to the SCSI command used for the first request or may be the same as the first request and the storage system can distinguish between a first request and a request to replace an already associated volume, by checking whether field 1031 indicates that no volume is attached (or a place holder volume is attached).

Stage 1260 is followed by a stage 1270 of removing the association of the place holder handle with the first selected volume and associating the place holder handle with the second selected volume. Stage 1270 may include dismounting the first selected volume and mounting the second selected volume or any other actions required for enabling access to the second selected volume and terminating access to the first selected volume.

Stage 1270 is followed by a stage 1280 of enabling access to a logical volume currently associated with the place holder handle, in this case, the second logical volume, in response to an access request indicative of the place holder volume.

FIG. 13 illustrates a sequence 1300 of operations for provisioning place holder handles for dynamically associating volumes of a certain volume family that includes an original volume and volumes derived from the original volume, such as snapshots and/or clones. The operations are performed by storage system 1000, e.g. by storage controller 1040. Sequence 1300 is different from sequence 1200 by allowing the host to request association of the handle with only a limited group of volumes, e.g. a family of volume, in order to better control the enforcement of access permission.

Sequence 1300 includes stage 1310 of creating a place holder handle configured for allowing access to any volume selected by the host from a certain volume family and provisioning the place holder to a host that requested the place holder handle.

Access permissions may be assigned to the host requesting the place holder handle, for example, by associating the place holder handle with access permissions for accessing the original volume, by the host. The access permissions may be: read-only, read/write, delete, etc. Any volume derived from the original volume inherits the access permissions assigned to the host in regard with the original volume. The place holder handle can be indicated as corresponding to the certain family of volumes, e.g., by indicating the handle as corresponding to the original volume that is the ancestor of the volume family and from whom other volumes in the family are derived. The access permissions and the indication of the corresponding volume family may be added to the entry of the handle in table 1020. The creation of the place holder handle can be in response to a management command issued by a system administrator on behalf of the host or by a host administrator.

Stage 1310 is followed by stage 1320 of receiving from the host a first request for associating the place holder handle with a first selected volume from among volumes of the snapshot family. The first request includes the identification (e.g. value) of the place holder handle and the identity of the first selected volume. The first selected volume may be, for example, a snapshot or a clone of the original volume. The first selected volume may be a snapshot or a clone that was created after the provisioning of the handle.

The first request can be received via the in-band data path as described for sequence 1200.

Sequence 1300 can include denying requests for associating the place holder handle with a volume that is not included in the certain volume family. Only volumes included in the family are supposed to be allowed for access by the host that created the handle.

Stage 1320 is followed by a stage 1330 of enabling the host to access the first selected volume in response to receiving an access request indicative of the place holder handle. This stage includes using the access permissions that were associated with the handle, for enabling the access to the first selected volume.

Sequence 1300 may further include the following stages of sequence 1200: 1230, 1235, 1240, 1245, 1255, 1260, 1270 and 1280.

The invention may also be implemented in a computer program for running on a computer system, at least including code portions for performing steps of sequences 1200 and 1300 when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

In embodiments of the presently disclosed subject matter, fewer, more and/or different stages than those shown in FIGS. 5B, 7 and 9 may be executed. In embodiments of the presently disclosed subject matter one or more stages illustrated in FIGS. 5B, 7 and 9 may be executed in a different order and/or one or more groups of stages may be executed simultaneously. FIGS. 1, 5A, 6 and 8 illustrate a general schematic of the system architecture in accordance with an embodiment of the presently disclosed subject matter. Each module in FIGS. 1 and 5A can be made up of any combination of software, hardware and/or firmware that performs the functions as defined and explained herein. The modules in FIGS. 1 and 5A may be centralized in one location or dispersed over more than one location. In other embodiments of the presently disclosed subject matter, the system may comprise fewer, more, and/or different modules than those shown in FIGS. 1 and 5A.

The subject matter of the present application can have features of different aspects and/or embodiments described above or their equivalents, in any combination thereof.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer program product that include a storage storing computer code for executing the method of the presently disclosed subject matter.

While various embodiments have been shown and described, it will be understood that there is no intent to limit the presently disclosed subject matter by such disclosure, but rather, it is intended to cover all modifications and alternate constructions falling within the scope of the presently disclosed subject matter, as defined in the appended claims:

The invention claimed is:

1. A method for accessing volumes, comprising:
provisioning by a storage system to a host, a place holder handle, without associating, upon provisioning, the place holder handle with any specific volume of accessible volumes comprised in said storage system;
receiving from the host a first request for associating said place holder handle with a first selected volume from among said accessible volumes;
associating the place holder handle with the first selected volume, in response to the first request;
enabling the host to access said first selected volume in response to receiving a first access request indicative of said place holder handle;
receiving from the host a second request for associating said place holder handle with a second selected volume from among said accessible volumes;
wherin the second selected volume differs from the first selected volume;

removing the association of the place holder handle with the first selected volume and associating the place holder handle with the second selected volume, in response to the second request;

enabling the host to access said second selected volume, in response to receiving a second access request indicative of said place holder handle, wherein the receiving of the second access request follows the receiving of the second request for associating the place holder handle with the second selected volume.

2. The method of claim 1, comprises denying the first access request if received before the reception of the first request for associating said place holder handle with the first selected volume.

3. The method of claim 1, comprises denying the first request for associating said place holder handle if received from a second host that is different from the host that was provisioned with said place holder handle.

4. The method of claim 1, wherein the first request for associating said place holder handle is received via an in-band data path.

5. The method of claim 1, wherein the first request for associating said place holder handle and the first access request are received via a same data path.

6. The method of claim 1, wherein the first request for associating said place holder handle is a SCSI command.

7. A storage system for accessing volumes, comprising:
a hardware storage controller configured to provision to a host, a place holder handle, without associating, upon the provision, the place holder handle with any specific volume of accessible volumes comprised in said storage system;
a data communication interface, coupled to the storage controller, for receiving from the host: (i) a first request for associating said place holder handle with a first selected volume from among said accessible volumes; and (ii) a second request for associating said place holder handle with a second selected volume from among said accessible volumes, wherin the second selected volume differs from the first selected volume;
the storage controller is further configured to: associate the place holder handle with the first selected volume, in response to the first request; enable the host to access said first selected volume in response to a reception of a first access request indicative of said place holder handle; remove the association of the place holder handle with the first selected volume and associate the place holder handle with the second selected volume, in response to the second request; and enable the host to access said second selected volume, in response to receiving a second access request indicative of said place holder handle, wherein the second access request is received after the second request for associating the place holder handle with the second selected volume.

8. The storage system of claim 7 is configured to deny the first access request if received before the reception of the first request for associating said place holder handle to the first selected volume.

9. The storage system of claim 7 is configured to deny the first request for associating said place holder handle if received from a second host that is different from the host that was provisioned with said place holder handle.

10. The storage system of claim 7, wherein the first request for associating said place holder handle is received via an in-band data path supported by the data communication interface.

11. The storage system of claim 7, wherein the first request for associating said place holder handle and the access request are received via a same data path supported by the data communication interface.

12. The storage system of claim 7, wherein the data communication interface is a SCSI (Small Computer System Interface) port and the first request for associating said place holder handle is a SCSI command.

13. A non-transitory computer readable medium that stores instructions for:
provisioning by a storage system to a host, a place holder handle, without associating, upon provisioning, the place holder handle with any specific volume of accessible volumes comprised in said storage system;
receiving from the host a first request for associating said place holder handle with a first selected volume from among said accessible volumes;
associating the place holder handle with the first selected volume, in response to the first request;
enabling the host to access said first selected volume in response to receiving a first access request indicative of said place holder handle;
receiving from the host a second request for associating said place holder handle with a second selected volume from among said accessible volumes, wherin the second selected volume differs from the first selected volume;
removing the association of the place holder handle with the first selected volume and associating the place holder handle with the second selected volume, in response to the second request;
enabling the host to access said second selected volume, in response to receiving a second access request indicative of said place holder handle,
wherein the receiving of the second access request follows the receiving of the second request for associating the place holder handle with the second selected volume.

14. A method for accessing volumes, comprising:
provisioning by a storage system to a host, a place holder handle, without associating, upon provisioning, the place holder handle with any specific volume of a certain volume family that comprises an original volume and derived volumes;
receiving from the host a first request for associating the place holder handle with a first selected volume from the certain volume family;
associating the place holder handle with the first selected volume, in response to the first request;
enabling the host to access said first selected volume in response to receiving a first access request indicative of said place holder handle;
receiving from the host a second request for associating said place holder handle with a second selected volume from among said accessible volumes,
wherin the second selected volume differs from the first selected volume;
removing the association of the place holder handle with the first selected volume and associating the place holder handle with the second selected volume, in response to the second request;
enabling the host to access said second selected volume, in response to receiving a second access request indicative of said place holder handle,
wherein the receiving of the second access request follows the receiving of the second request for associating the place holder handle with the second selected volume.

15. The method of claim 14, wherein the derived volumes are selected from snapshots and clones of the original volume.

16. The method of claim 14, wherein the first selected volume is a snapshot of the original volume.

17. The method of claim 14, wherein the first selected volume is a snapshot that was created from the original volume after the provisioning of the place holder volume.

18. The method of claim 14 comprising denying requests for associating the place holder handle with a volume that is not comprised in the certain volume family.

19. The method of claim 14, wherein the provisioning comprises associating the place holder handle with access permissions for accessing the original volume by the host; and wherein the method comprises using said access permissions for enabling the access to the first selected volume.

\* \* \* \* \*